United States Patent
Guan et al.

(10) Patent No.: US 8,264,798 B1
(45) Date of Patent: Sep. 11, 2012

(54) SYSTEMS AND METHODS FOR PROVIDING MAGNETIC RECORDING HEADS ADAPTED FOR WRITING SHINGLED TRACKS

(75) Inventors: Lijie Guan, San Jose, CA (US); Suping Song, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 73 days.

(21) Appl. No.: 12/822,120

(22) Filed: Jun. 23, 2010

(51) Int. Cl.
*G11B 5/127* (2006.01)

(52) U.S. Cl. ................................................ 360/319

(58) Field of Classification Search .............. 360/125.12, 360/125.08, 125.3, 125.47, 319, 313; 29/603.13, 29/604.14
See application file for complete search history.

(56) References Cited

U.S. PATENT DOCUMENTS

| | | | |
|---|---|---|---|
| 6,282,056 B1 | 8/2001 | Feng et al. | |
| 6,480,355 B1 | 11/2002 | Kamijima | |
| 6,487,041 B2 | 11/2002 | Yamanaka et al. | |
| 6,504,675 B1 | 1/2003 | Shukh et al. | |
| 6,754,947 B2 | 6/2004 | Stageberg et al. | |
| 6,891,697 B2 | 5/2005 | Nakamura et al. | |
| 6,940,690 B2 | 9/2005 | Tomiyama et al. | |
| 6,950,277 B1 | 9/2005 | Nguy et al. | |
| 6,995,949 B2 | 2/2006 | Nakamura et al. | |
| 7,221,539 B2 | 5/2007 | Takano et al. | |
| 7,324,304 B1 | 1/2008 | Benakli et al. | |
| 7,372,664 B1 | 5/2008 | Mallary et al. | |
| 7,712,207 B2 * | 5/2010 | Pentek et al. | 29/603.16 |
| 7,715,147 B2 * | 5/2010 | Feldbaum et al. | 360/125.3 |
| 7,768,743 B2 * | 8/2010 | Guthrie et al. | 360/125.13 |
| 7,796,360 B2 | 9/2010 | Im et al. | |
| 7,796,361 B2 | 9/2010 | Sasaki et al. | |
| 7,804,662 B2 * | 9/2010 | Chen et al. | 360/125.12 |
| 7,924,528 B2 | 4/2011 | Sasaki et al. | |
| 2005/0057853 A1 | 3/2005 | Nakamura et al. | |
| 2007/0211380 A1 | 9/2007 | Akimoto et al. | |
| 2007/0283557 A1 | 12/2007 | Chen et al. | |
| 2008/0151437 A1 | 6/2008 | Chen et al. | |
| 2008/0180861 A1 | 7/2008 | Maruyama et al. | |
| 2008/0273276 A1 | 11/2008 | Guan | |
| 2008/0273277 A1 | 11/2008 | Guan et al. | |
| 2008/0278861 A1 * | 11/2008 | Jiang et al. | 360/319 |
| 2009/0168242 A1 | 7/2009 | Liu | |
| 2009/0290257 A1 | 11/2009 | Kimura et al. | |
| 2011/0007428 A1 * | 1/2011 | Batra et al. | 360/319 |
| 2011/0051293 A1 | 3/2011 | Bai et al. | |
| 2011/0205671 A1 * | 8/2011 | Benakli et al. | 360/319 |
| 2011/0222188 A1 | 9/2011 | Etoh et al. | |

* cited by examiner

Primary Examiner — Angel A. Castro

(57) ABSTRACT

A magnetic recording head including a write pole and a shield. The write pole has a pole tip face that is parallel to the air bearing surface of the magnetic recording head, a leading surface having a leading edge at the pole face, a first side surface having a first side edge at the pole face, a second side surface having a second side edge at the pole face, and a trailing surface having a trailing edge at the pole face. The shield surrounds the first side surface, the trailing surface, and the second side surface of the write pole tip, and is separated from the first side surface of the write pole tip by a first side gap, from the trailing surface of the write pole tip by a trailing gap, and from the second side surface of the write pole tip by a second side gap. There is a notch formed in the inner wall of the shield adjacent to the corner of the write pole tip formed by one side surface and the trailing surface of the write pole tip.

18 Claims, 7 Drawing Sheets

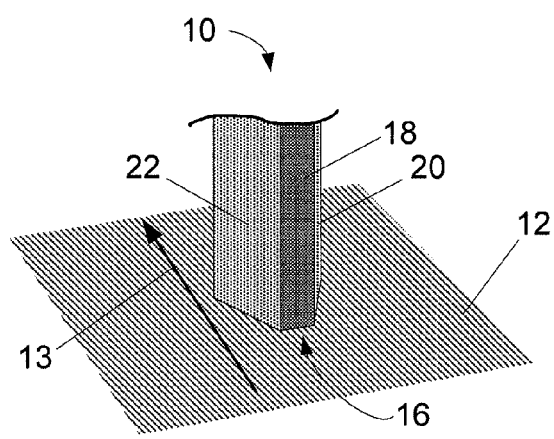
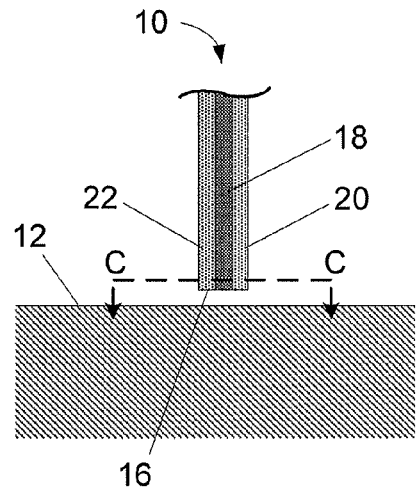
FIG. 1A
FIG. 1B
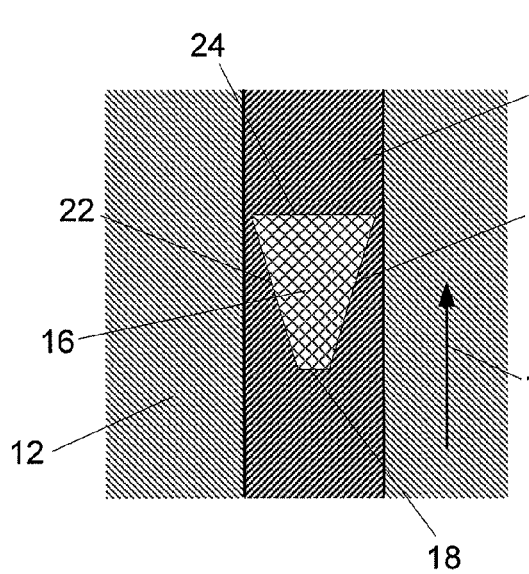
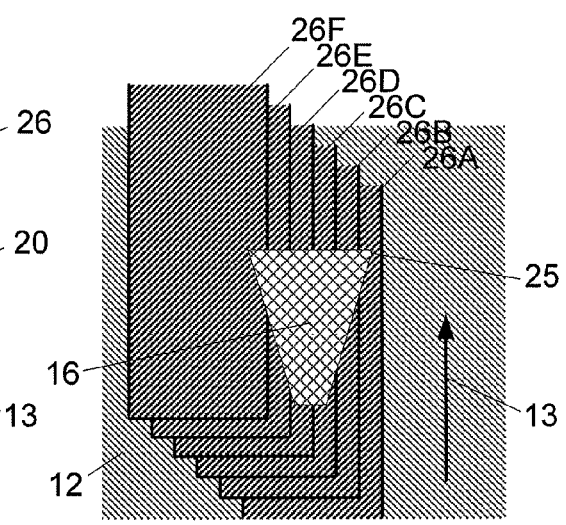
FIG. 1C
FIG. 1D

SYSTEMS AND METHODS FOR PROVIDING MAGNETIC RECORDING HEADS ADAPTED FOR WRITING SHINGLED TRACKS

BACKGROUND

1. Field

The present disclosure generally relates to magnetic recording and, in particular, to magnetic recording heads adapted for writing shingled tracks.

2. Description of the Related Art

One of the devices used to store data for long-term retention in a computer is referred to as a magnetic hard disk drive. A disk drive includes a magnetic rotating disk and read and/or write heads that move across the surface of the disk as it rotates. The read/write heads are biased toward the surface of the disk and when the disk rotates, the head floats on a cushion of the air that is moving with the disk. As this layer of air separates the moving disk surface from the relatively stationary read/write head in the same way that an oil bearing separates the moving parts in an engine, the layer of air and the surface of the read/write head are referred to as an "air bearing." As the disk rotates under the read/write head, the write head generates a varying magnetic field to create transitions in the magnetic material of the disk according to signals from the processing circuitry of the computer.

Magnetic materials are characterized by a property called "coercivity" which is related to how easily the material is magnetized. A material having a low value of coercivity is considered magnetically "soft." Conversely, a material having a high value of coercivity is considered magnetically "hard" and, once magnetized in a particular orientation, requires a strong field to re-orient the magnetization of the material. Magnetically hard materials are suitable for non-volatile data storage as a pattern of magnetization can be created in the material by a strong magnetic field, such as the field created by a magnetic recording head, and the pattern of magnetization will not change until rewritten by the strong magnetic field of the magnetic recording head.

A perpendicular recording system records data as magnetizations that are oriented perpendicular to the plane of the magnetic disk. A magnetic disk configured for use in this type of system has a magnetically soft underlayer and a thin magnetically hard surface layer. A perpendicular magnetic recording head has a write pole having a very small cross-section and a return pole that has a much larger cross-section. A strong magnetic field emerges from the write pole tip in a direction perpendicular to the magnetic disk surface and passes through the top layer of the disk, magnetizing the magnetically hard material of the top layer. The magnetic field then spreads out in the soft underlayer and returns to the return pole through a larger area of the top layer such that the strength of the field as it passes through the top layer is sufficiently low that it does not affect the magnetization of the top layer.

To increase the data density of magnetic hard disk drives, some drives utilize a "shingled" configuration of tracks, wherein adjacent tracks are partially overlapped in much the same way that rows of roof shingles are laid down. Writing a shingled track overwrites a portion of the previously written track that is immediately adjacent to it, requiring the tracks to be written in a specific order. The effective width of a track, which is the portion of the written track that retains the magnetization of the original signal after the following adjacent track is written, may be 10% or less of the width of a recording head. As a result, the magnetic field that writes to the final track is the part of the field around the trailing "final" corner. The quality of the magnetic field in a shingled-writing magnetic recording head is characterized by the radius of the magnetic field at the trailing corner.

SUMMARY

The disclosed magnetic recording head provides a smaller radius magnetic field at the trailing corner than conventional designs. This is accomplished by modifying the shape of the WAS that surrounds the pole tip of the magnetic recording head. A notch is provided in the trailing corner of the WAS. The notch tends to "pull" the magnetic field of the pole tip outward toward the notch.

A magnetic recording head is disclosed. The magnetic recording head includes a write pole tip having a pole face arranged parallel to an air bearing surface of the magnetic recording head, a leading surface having a leading edge at the pole face, a first side surface having a first side edge at the pole face, a second side surface having a second side edge at the pole face, and a trailing surface having a trailing edge at the pole face. The magnetic recording head also includes a shield surrounding the first side surface, the trailing surface, and the second side surface of the write pole tip, wherein the shield is separated from the first side surface of the write pole tip by a first side gap, from the trailing surface of the write pole tip by a trailing gap, and from the second side surface of the write pole tip by a second side gap. The magnetic recording head also includes a first notch formed in the inner wall of the shield adjacent to a first corner of the write pole tip formed by the first side surface of the write pole tip and the trailing surface of the write pole tip.

A method of fabricating a magnetic recording head is disclosed. The method includes the steps of forming a write pole tip having a pole face arranged parallel to an air bearing surface of the magnetic recording head, a leading surface having a leading edge at the pole face, a first side surface having a first side edge at the pole face, a second side surface having a second side edge at the pole face, and a trailing surface having a trailing edge at the pole face, forming a shield surrounding the first side surface, the trailing surface, and the second side surface of the write pole tip, wherein the shield is separated from the first side surface of the write pole tip by a first side gap, from the trailing surface of the write pole tip by a trailing gap, and from the second side surface of the write pole tip by a second side gap; and forming a first notch formed in an inner wall of the shield adjacent to a first corner of the write pole tip formed by the first side surface of the write pole tip and the trailing surface of the write pole tip.

BRIEF DESCRIPTION OF THE DRAWINGS

The accompanying drawings, which are included to provide further understanding and are incorporated in and constitute a part of this specification, illustrate disclosed configurations and together with the description serve to explain the principles of the disclosed configurations. In the drawings:

FIGS. 1A-B illustrate a side view and a front view, respectively, of the construction of a magnetic recording head configured to write shingled tracks of data on magnetic media.

FIG. 1C illustrates a view looking down onto the surface of the magnetic media as seen from view C-C of FIG. 1B.

FIG. 1D illustrates an example of how shingled tracks are sequentially written in relation to a write pole tip.

DETAILED DESCRIPTION

Figure 2A:
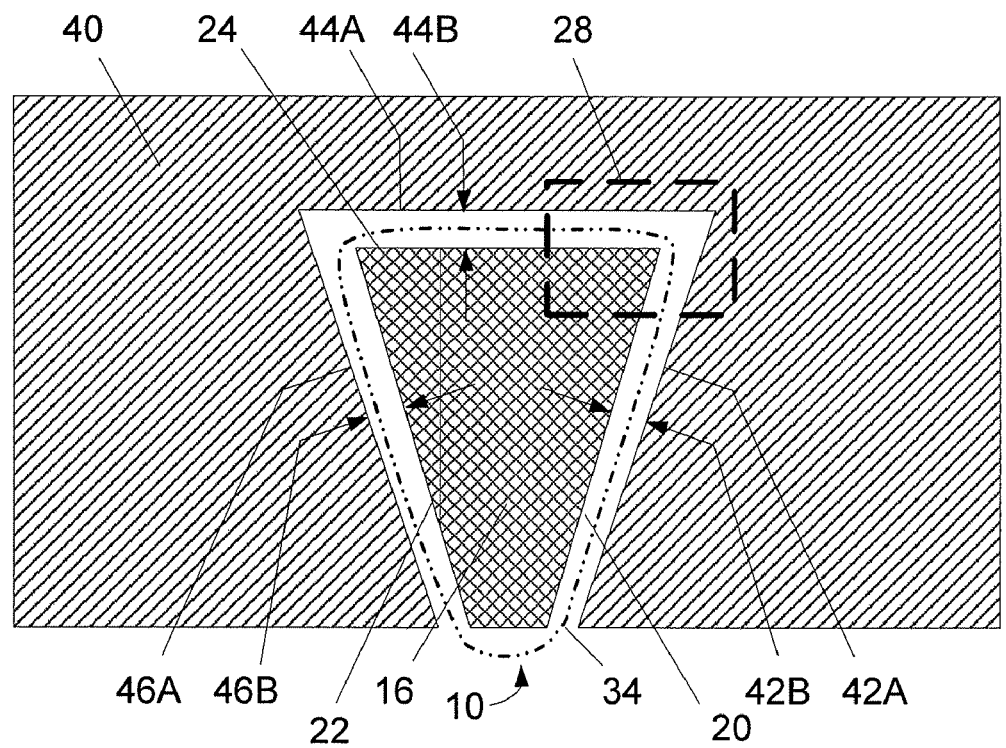
FIGS. 2A & 2B illustrate the magnetic field produced by the pole tip of a magnetic recording head configured to write shingled tracks of data on magnetic media.

The system and method disclosed herein describe a magnetic recording head, and the method of creating such, that provides a more uniform magnetic field across the width of a shingled track that is being recorded on a magnetic media of the type used in hard disk drives contained in many personal computers as well as other computing systems.

In the following detailed description, numerous specific details are set forth to provide a full understanding of the present disclosure. It will be apparent, however, to one ordinarily skilled in the art that aspects of the present disclosure may be practiced without some of the specific details. In other instances, well-known structures and techniques have not been shown in detail so as not to obscure the disclosure.

FIGS. 1A-B illustrate a perspective view and a front view, respectively, of a write pole configured to write shingled tracks of data on magnetic media. FIG. 1A is a perspective view of the pole tip 10 of a magnetic recording head located above the surface of magnetic media 12. The media 12 is moving, in this example and view, as indicated by arrow 13 while the pole tip 10 is stationary. Pole tip 10 has a pole face 16 (not visible) that is parallel to the surface of magnetic media 12 and is also parallel to the air bearing surface of the magnetic recording head (not shown). The pole tip 10 has a leading surface 18 that is, in this example, substantially vertical and side surfaces 20 and 22. Leading surface 18 is joined to pole face 16 at the leading edge of pole face 16, and side surfaces 20 and 22 are likewise joined to pole face 16 at the side edges of pole face 16. FIG. 1B is a front view of the same pole tip 10 and it can be seen that, in this example, the pole tip 10 is symmetric. The broken line C-C indicates the approximate location of a cross-section viewing plane of the pole face 16 of pole tip 10.

FIG. 1C illustrates a view looking down onto the magnetic media 12 of the magnetic media 12 as seen from view C-C of FIG. 1B. The leading surface 18, side surfaces 20 and 22, and trailing surface 24, which connects to pole face 16 at the trailing edge of pole face 16, are edgewise visible as lines in this view. The magnetic media 12 is moving in the direction of arrow 13. The vertical stripe on magnetic media 12 is shingle track 26, which represents the full width of the stripe where data is written onto or into media 12.

FIG. 1D illustrates an example of how shingled tracks 26A-26F are sequentially written in relation to the write pole tip. Shingle track 26A has the same relative position to pole face 16 as shingle track 26 in FIG. 1C and represents the approximate location of pole face 16 while writing shingle track 26A. FIG. 1D shows shingle track 26B as written sequentially after shingle track 26A and it can be seen that shingle track 26B overlaps a portion of shingle track 26A. The data signal that was recorded into the portion of shingle track 26A that was overwritten is lost as a new signal is written to shingle track 26B. In a similar manner, shingle tracks 26C, 26D, 26E, and 26F are sequentially written and each track erases a portion of the previously written track. As such, only the residual width of the written area is considered a track in a shingle-writing system, and this residual width is treated as a full shingle track hereafter. The corner of pole tip 10 that writes to the residual width of the track is referred to herein as the "trailing final" corner 25. This provides a higher data density on magnetic media 12 with the addition of some complexity in how data is written.

Figure 2B:
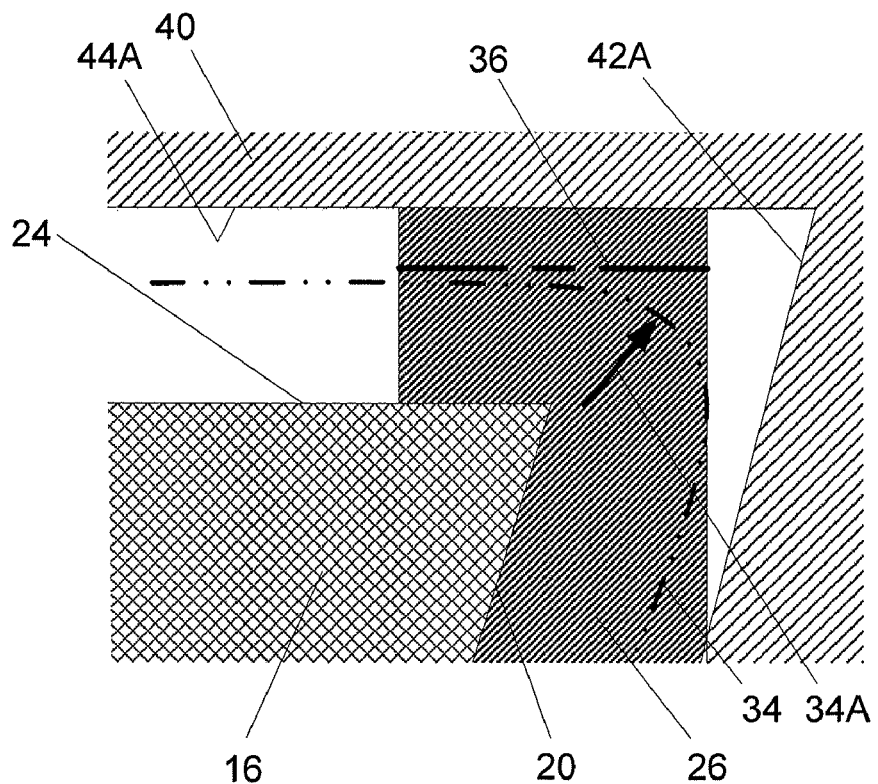

FIGS. 2A & 2B illustrate the magnetic field produced by the pole tip 10 of a magnetic recording head configured to write shingled tracks of data on magnetic media. This view is again looking down from plane C-C in FIG. 1B. A Wrap-Around Shield (WAS) 40 has side surfaces 42A and 46A adjacent and substantially parallel to side surfaces 20 and 22, respectively, of pole tip 10 and separated from the side surfaces by a first side gap 42B and a second side gap 46B. Trailing surface 44A is adjacent and substantially parallel to trailing surface 24 of pole tip 10 and is separated from trailing surface 24 by a trailing gap 44B. The dot-dash line represents field profile 34 and indicates the location where the magnetic field that is created by the pole tip 10 has a constant strength, analogous to a contour line on a topographical map. It can be seen that the magnetic field profile 34 approximately follows the profile of the pole tip 10, with the magnetic field profile 34 having rounded corners characterized by a radius. The area of FIG. 2A indicated by the dashed outline 28 is enlarged in FIG. 2B.

FIG. 2B shows the trailing corner of pole face 16 formed by the intersection of side surface 20 and trailing surface 24 and the trailing corner of WAS 40 that is formed by the intersection of side surface 42A and trailing surface 44A. Track 26, which is the residual track of data being currently written, is shown similar to that of track 26A of FIG. 1D. The magnetic field profile 34 is shown with its associated radius 34A. An ideal shape for the magnetic field profile across the width of track 26 is a straight line as indicated by dashed line 36.

Figure 2C:
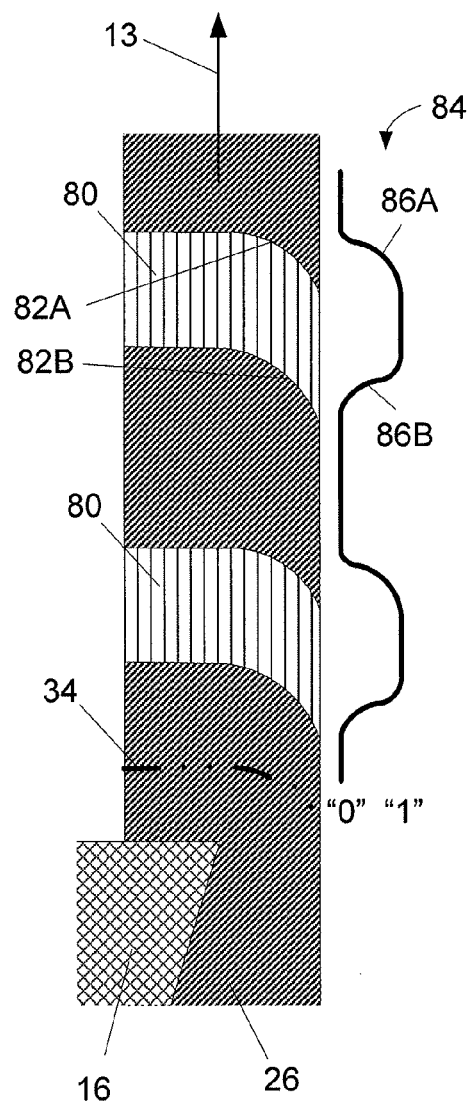
FIGS. 2C & 2D illustrate the magnetization areas produced by magnetic recording heads according to certain aspects of the present disclosure.
Figure 2D:
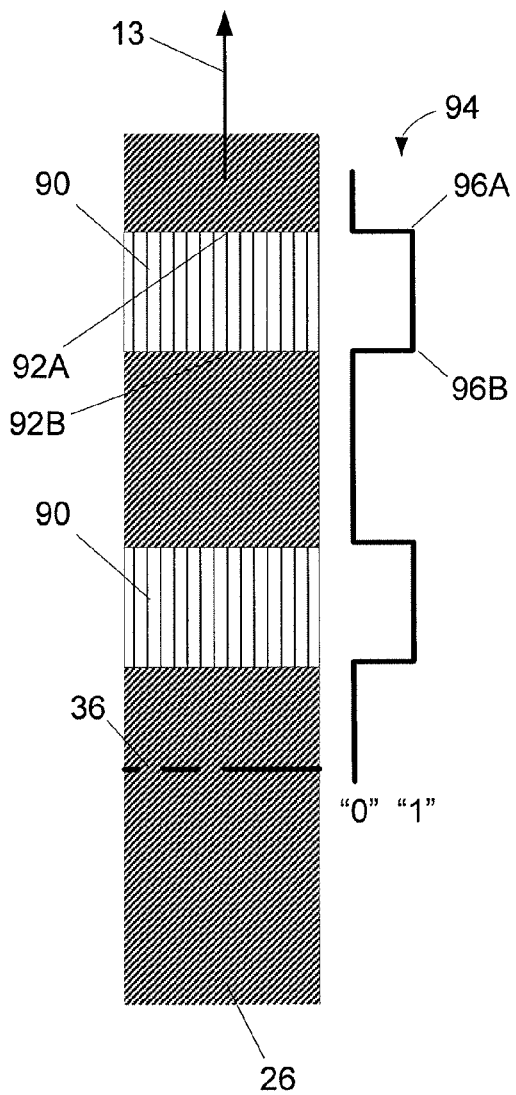

FIGS. 2C & 2D illustrate the magnetization areas produced by magnetic recording heads according to certain aspects of the present disclosure. FIG. 2C shows a track 26 in relation to the pole face 16 of a magnetic recording head. In this example, the area of track 26 that is magnetized in a state equivalent to a bit value of "1" is shown by areas 80 and 90, where the remaining portions of track 26 are in a state equivalent to a bit value of "0." The curved magnetic field profile 34 in FIG. 2C produces a magnetized area 80 having a curved leading portion 82A and a curved trailing portion 82B that are produced as the track 26 moves in the direction indicated by arrow 13. Signal 84 is an example output of a read head (not shown) passing over track 26 after it has been recorded. The output 84 changes from a "0" to a "1" in region 86A over a period of time that is related to the distance over which the leading edge 82 is curved. Similarly, the transition 86B from a "1" to a "0" is rounded over a period of time related to trailing edge 82B.

FIG. 2D shows an idealized magnetization pattern where the magnetic field profile is the ideal straight dashed line 36 shown in FIG. 2B and repeated here. Pole face 16 is not shown to emphasize that this is an idealized configuration. The magnetization areas 90 are rectangles and the leading edge 92A and trailing edge 92B are straight lines. The output 94 from a read head passing over this idealized track 26 is a series of square waves with a sharp corner 96A at the leading edge and a sharp corner 96B at the trailing edge. Detecting the change of state of the rounded over signal 84 of FIG. 2C takes longer and is less reliable than detecting the change of state for the square wave 94 of FIG. 2D and, as such, the minimum spacing of areas 80 is greater than the minimum spacing of areas 90. As the radius 34A of FIG. 2B decreases, approaching the perfect straight line profile 36, the reliability of detecting the transitions between "1"s and "0"s may increase and it may be possible to increase the density of the data recorded on the magnetic disk by reducing the space between areas 80 and/or reducing the width of track 26.

Figure 3A:
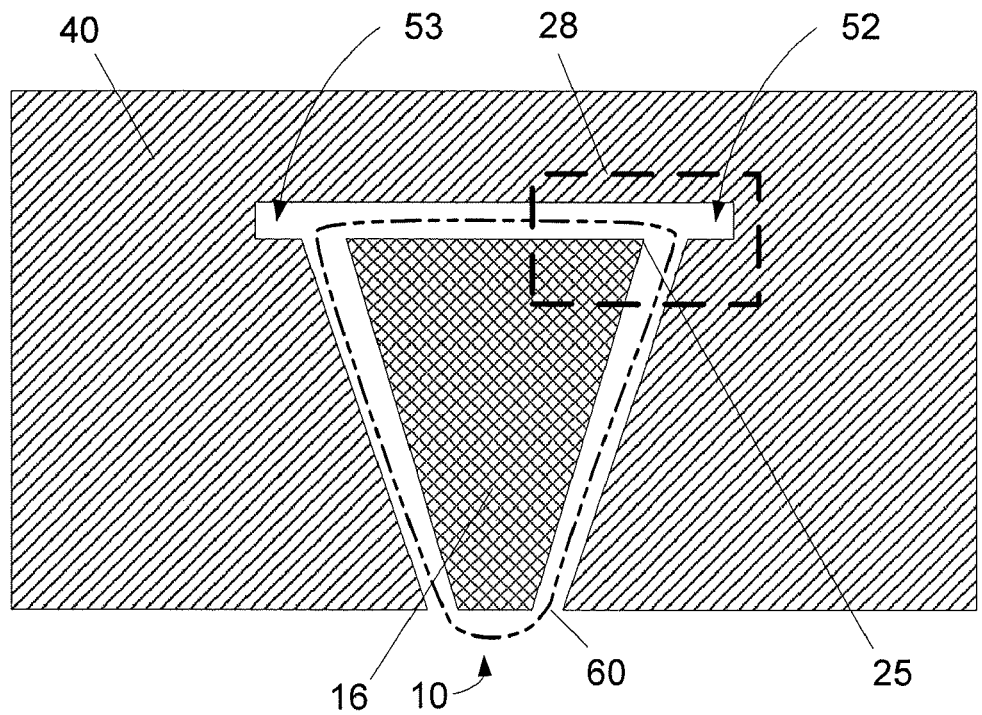
FIGS. 3A & 3B illustrate an example of a notch in the inner wall of Wrap-Around Shield according to certain aspects of the present disclosure.
Figure 3B:
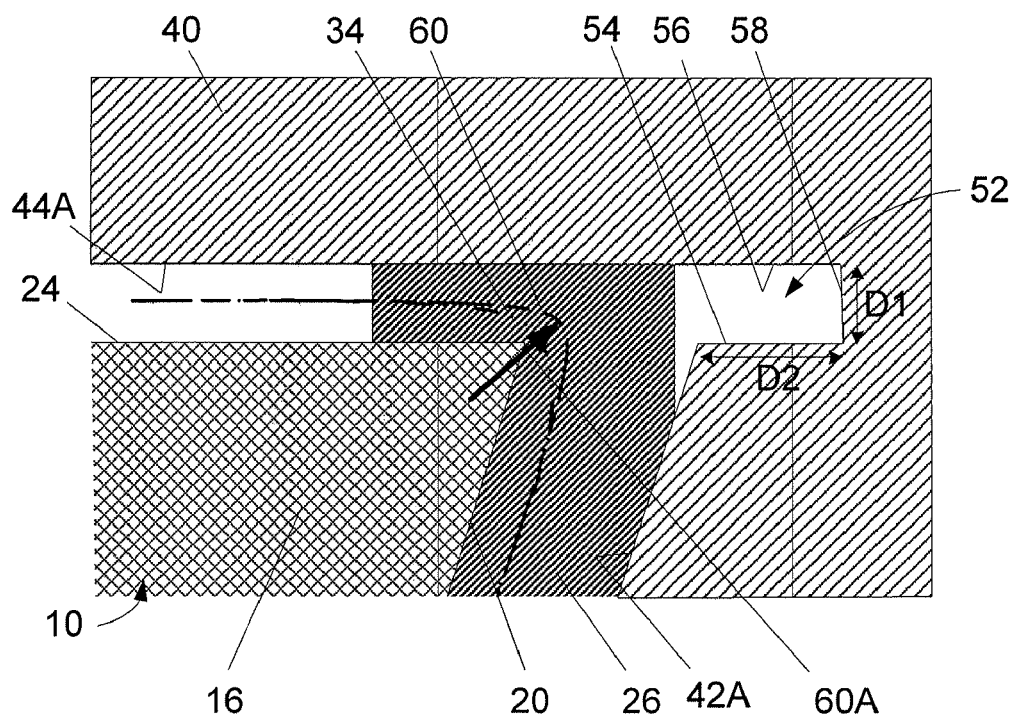

FIGS. 3A & 3B illustrate an example of a notch in the inner wall of the Wrap-Around Shield (WAS) 40 according to certain aspects of the present disclosure. FIG. 3A shows a pole face 16 of pole tip 10 surrounded by WAS 40. In this example, a notch 52 is formed in the trailing final corner of the inner wall of WAS 40, adjacent to the trailing final corner 25 of the pole tip 10. FIG. 3A also shows a notch 53 in the other corner of the WAS 40. Certain configurations may have a notch in only one of the two corners, while other configurations may have notches in both corners. The notch in WAS 40 helps shape magnetic field profile 60 to have a shape closer to an ideal magnetic field profile than that of magnetic field profile 34 shown in FIGS. 2A and 2B. Outline 28 shows the area enlarged in FIG. 3B.

FIG. 3B illustrates an example notch 52 having a front or leading wall 54, a back or trailing wall 56, and a distal wall 58. Trailing wall 56 is separated from the leading wall 54 by a distance D1. In this example, leading wall 54 of notch 52 is coplanar with trailing surface 24 of pole tip 10, and trailing wall 56 of notch 52 is coplanar with trailing surface 44A of WAS 40 such that the separation of leading wall 54 and trailing wall 56 is equal to the trailing gap between trailing surface 24 of pole tip 10 and the trailing surface 44A of the WAS 40. Distal wall 58 is perpendicular to the leading and trailing walls and is separated from the edge of side surface 42A by distance D2. In this example, The magnetic field profile 60 has a radius 60A that, in this example, is smaller than that of field profile 34, shown here for reference. In other configurations, leading wall 56 may not be coplanar with surface 44A and trailing wall 54 may not be coplanar with surface 24. Distal wall 58 is shown as a flat surface with square corners at walls 54 and 56, whereas other configurations may have a non-planar distal wall 58 and rounded corners at walls 54 and 56 according to, among other factors, the method of creating notch 52. For example, if notch 52 is formed by an etch process, distal wall 58 may have a concave shape and the corners may have a radius. The method of forming the notches is not limited to any particular type of manufacturing process/technique and processes/techniques known to those skilled in the art may be used to form a magnetic recording head that includes a notched WAS.

Figure 4A:
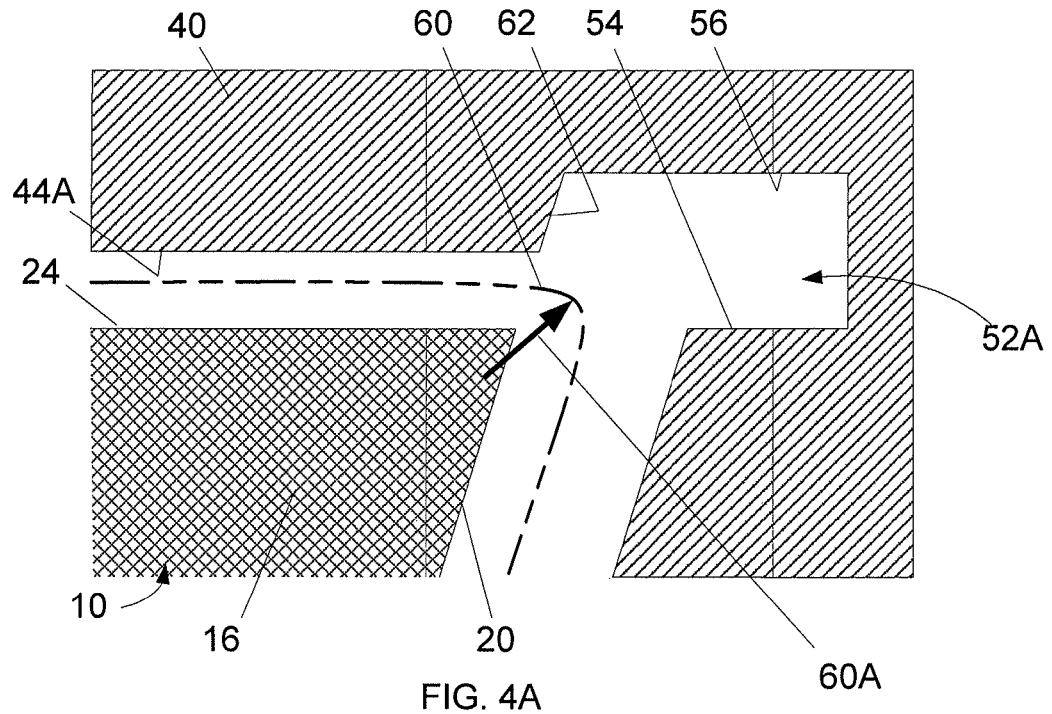
FIGS. 4A & 4B illustrate other example configurations of a notch in the Wrap-Around Shield according to certain aspects of the present disclosure.
Figure 4B:
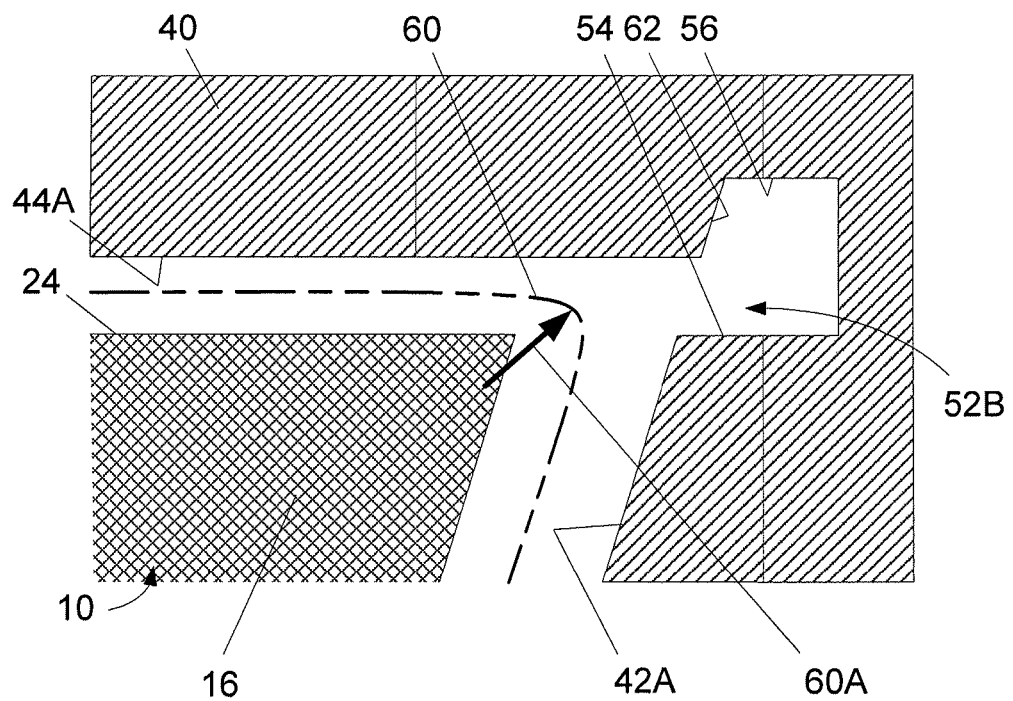

FIGS. 4A & 4B illustrate other example configurations of a notch in the Wrap-Around Shield 40 according to certain aspects of the present disclosure. In these figures, track 26 has been omitted for clarity. In FIG. 4A, trailing wall 56 of notch 52A is offset from trailing surface 44A of WAS 40, creating a proximal wall 62 that is, in this example, coplanar with side surface 20 of pole tip 10 while leading wall 54 is coplanar with trailing surface 24. FIG. 4B illustrates a configuration of notch 52B where trailing wall 56 is offset from trailing surface 44A of WAS 40 as in FIG. 4A, proximal wall 62 is coplanar with side surface 42A of the WAS 40, and leading wall 54 is coplanar with trailing surface 24 of pole face 16. The configurations of notches 52A and 52B in FIGS. 4A and 4B may further modify the shape of magnetic field profile 60 and reduce radius 60A compared to FIG. 3B.

In the configurations described above with respect to FIGS. 3A, 3B, 4A, and 4B, distance D1 separating trailing wall 56 from leading wall 54 may be in the range of 20-150 nanometers. For example, distance D1 may be approximately 30 nanometers in the configuration depicted in FIG. 3B. The distance D2 separating distal wall 58 from side surface 42A of WAS 40 may be in the range of 10-50 nanometers. For example, D2 may be approximately 40 nanometers in the configuration depicted in FIG. 3B.

Figure 5:
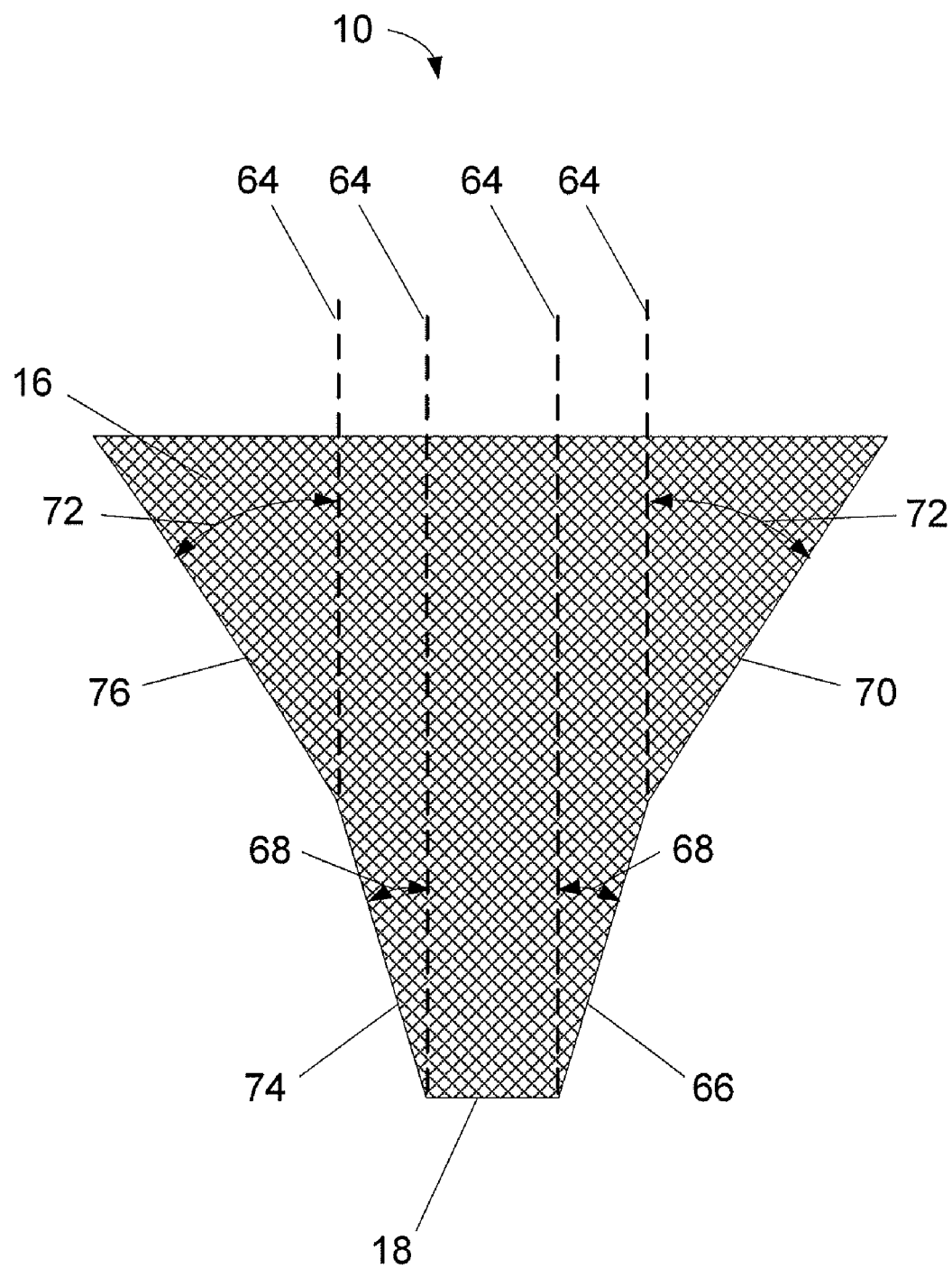
FIG. 5 illustrates a modified pole tip according to certain aspects of the present disclosure.

FIG. 5 illustrates a modified pole tip 10 according to certain aspects of the present disclosure. This view is again of pole face 16 in accordance with a view from plane C-C of FIG. 1B. In this example, leading surface 18 is the same as in FIG. 1C. The side surfaces 20 and 22 of FIG. 1C, however, have been segmented into top and bottom portions, with the "top" and "bottom" defined, for this specific example, relative to the orientation of the pole face 16 as seen in FIG. 5. The two side surfaces have bottom portions 66 and 74, respectively, that are at an angle 68 from a normal 64, i.e. an axis that is perpendicular to the plane of leading surface 18, as shown in profile in FIG. 5. The broken lines 64 are all normals to leading surface 18. Each side surface also has a top portion 70 and 76, respectively, that are at an angle 72 from a normal 64, wherein angle 72 is greater than angle 68. According to one aspect, angle 68 is 10 degrees. However, angle 68 may vary between 8 and 15 degrees. According to one aspect, angle 72 is 20 degrees. However, angle 72 may vary between 5 and 25 degrees.

Figure 6:
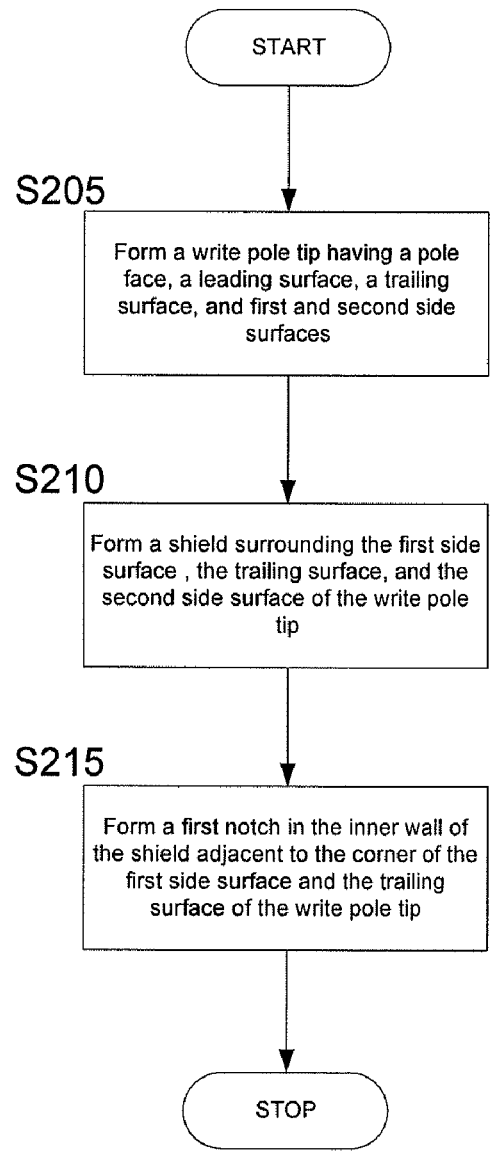
FIG. 6 is a flow chart illustrating a method of fabricating a magnetic recording head according to certain aspects of the present disclosure.

FIG. 6 is a flow chart illustrating a method of fabricating a magnetic recording head according to certain aspects of the present disclosure. The first step S205 is to form a write pole tip having a pole face arranged parallel to an air bearing surface of the magnetic recording head. The pole tip will have a leading surface having a leading edge at the pole face, a first side surface having a first side edge at the pole face, a second side surface having a second side edge at the pole face, and a trailing surface having a trailing edge at the pole face. The side surfaces may be planar or shaped with multiple angles as descried herein. Step S210 is to form a shield surrounding the first side surface, the trailing surface, and the second side surface of the write pole tip. The shield is separated from the first side surface of the write pole tip by a first side gap, from the trailing surface of the write pole tip by a trailing gap, and from the second side surface of the write pole tip by a second side gap. The third step S215 is to form a first notch in the inner wall of the shield adjacent to the corner of the write pole tip formed by the first side surface of the write pole tip and the trailing surface of the write pole tip. The shape of this notch may be any of the configurations disclosed herein or other configurations as discussed. Those skilled in the art will recognize that known fabrication processes and techniques may be used to fabricate a magnetic recording head having the configurations described above. Accordingly, a detailed discussion of the fabrication processes will not be presented herein.

It can be seen that the disclosed configurations of the magnetic recording head provide a smaller radius in the shape of the magnetic field profile at the trailing corner of the write tip pole. This modified magnetic field profile is created by the presence of a notch in the trailing corner of the WAS. This sharper field corner provides a field profile that is closer to a straight line across the track being recorded than previous recording heads. This reduced radius may provide higher reliability and/or higher density recording within the magnetic disk drive.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A magnetic recording head comprising:
   a write pole tip having a pole face arranged parallel to an air bearing surface of the magnetic recording head, a leading surface having a leading edge at the pole face, a first side surface having a first side edge at the pole face, a second side surface having a second side edge at the pole face, and a trailing surface having a trailing edge at the pole face;
   a shield surrounding the first side surface, the trailing surface, and the second side surface of the write pole tip, wherein the shield is separated from the first side surface of the write pole tip by a first side gap, from the trailing surface of the write pole tip by a trailing gap, and from the second side surface of the write pole tip by a second side gap; and
   a first notch formed in an inner wall of the shield adjacent to a first corner of the write pole tip formed by the first side surface of the write pole tip and the trailing surface of the write pole tip,
   wherein the first side surface of the write pole tip comprises a first bottom portion arranged at a first angle from a normal to the leading surface of the write pole tip, and a first top portion arranged a second angle greater than the first angle from the normal to the leading surface of the write pole tip, and
   wherein the second side surface of the write pole tip comprises a second bottom portion arranged at the first angle from the normal to the leading surface of the write pole tip, and a second top portion arranged at the second angle from the normal to the leading surface of the write pole tip.

2. The magnetic recording head according to claim 1, wherein the first notch comprises a leading wall arranged co-planar with the trailing surface of the write pole tip, a trailing wall parallel to and separated from the leading wall by a first distance, and a distal wall perpendicular to the leading and trailing walls and separated from the inner surface of the shield by a second distance.

3. The magnetic recording head according to claim 2, wherein the second distance from the inner wall of the shield to the distal wall of the first notch is between 10 and 50 nanometers.

4. The magnetic recording head according to claim 3, wherein the second distance from the inner wall of the shield to the distal wall of the first notch is 40 nanometers.

5. The magnetic recording head according to claim 2, wherein the first distance between the leading and trailing walls of the first notch is equal to the trailing gap between the shield and the trailing surface of the write pole tip.

6. The magnetic recording head according to claim 2, wherein the first distance between the leading and trailing walls of the first notch is between 20 and 150 nanometers.

7. The magnetic recording head according to claim 6, the first distance is 30 nanometers.

8. The magnetic recording head according to claim 2, wherein the first notch further comprises a proximal wall arranged co-planar with the first side surface of the write pole tip.

9. The magnetic recording head according to claim 2, wherein the first notch further comprises a proximal wall arranged co-planar with a portion of the inner wall of the shield adjacent to the first side surface of the write pole tip.

10. The magnetic recording head according to claim 1, further comprising a second notch formed in the inner wall of the shield adjacent to a second corner of the write pole tip formed by the second side surface of the write pole tip and the trailing surface of the write pole tip.

11. The magnetic recording head according to claim 1, wherein the first angle is between 8 degrees and 15 degrees, and the second angle is between 15 degrees and 25 degrees.

12. The magnetic recording head according to claim 11, wherein the first angle is 10 degrees.

13. The magnetic recording head according to claim 11, wherein the second angle is 20 degrees.

14. A method for fabricating a magnetic recording head comprising the steps of:
- forming a write pole tip having a pole face arranged parallel to an air bearing surface of the magnetic recording head, a leading surface having a leading edge at the pole face, a first side surface having a first side edge at the pole face, a second side surface having a second side edge at the pole face, and a trailing surface having a trailing edge at the pole face;
- forming a shield surrounding the first side surface, the trailing surface, and the second side surface of the write pole tip, wherein the shield is separated from the first side surface of the write pole tip by a first side gap, from the trailing surface of the write pole tip by a trailing gap, and from the second side surface of the write pole tip by a second side gap; and
- forming a first notch formed in an inner wall of the shield adjacent to a first corner of the write pole tip formed by the first side surface of the write pole tip and the trailing surface of the write pole tip,
- wherein the first side surface of the write pole tip comprises a first bottom portion arranged at a first angle from a normal to the leading surface of the write pole tip, and a first top portion arranged a second angle greater than the first angle from the normal to the leading surface of the write pole tip, and
- wherein the second side surface of the write pole tip comprises a second bottom portion arranged at the first angle from the normal to the leading surface of the write pole tip, and a second top portion arranged at the second angle from the normal to the leading surface of the write pole tip.

15. The method according to claim 14, wherein the step of forming the first notch comprises:
- forming a leading wall arranged co-planar with the trailing surface of the write pole tip;
- forming a trailing wall parallel to and separated from the leading wall by a first distance; and
- forming a distal wall perpendicular to the leading and trailing walls and separated from the inner surface of the shield by a second distance.

16. The method according to claim 15, wherein the step of forming the first notch further comprises forming a proximal wall arranged co-planar with the first side surface of the write pole tip.

17. The method according to claim 15, wherein the step of forming the first notch further comprises forming a proximal wall arranged co-planar with a portion of the inner wall of the shield adjacent to the first side surface of the write pole tip.

18. The method according to claim 14, further comprising the step of forming a second notch in the inner wall of the shield adjacent to a second corner of the write pole tip formed by the second side surface of the write pole tip and the trailing surface of the write pole tip.

* * * * *